(12) United States Patent
Bugrin et al.

(10) Patent No.: US 9,657,557 B2
(45) Date of Patent: May 23, 2017

(54) METHODS FOR SERVICING SUBTERRANEAN WELLS

(75) Inventors: Vladimir Sergeevich Bugrin, Moscow (RU); Diankui Fu, Kuala Lumpur (MY)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 13/879,026

(22) PCT Filed: Nov. 12, 2010

(86) PCT No.: PCT/RU2010/000665
§ 371 (c)(1),
(2), (4) Date: May 22, 2013

(87) PCT Pub. No.: WO2012/064211
PCT Pub. Date: May 18, 2012

(65) Prior Publication Data
US 2013/0233553 A1    Sep. 12, 2013

(51) Int. Cl.
*E21B 19/18* (2006.01)
*E21B 43/16* (2006.01)
(Continued)

(52) U.S. Cl.
CPC .............. *E21B 43/16* (2013.01); *C09K 8/00* (2013.01); *C09K 8/50* (2013.01); *C09K 8/512* (2013.01);
(Continued)

(58) Field of Classification Search
CPC ................................. E21B 19/18; E21B 43/14
(Continued)

(56) References Cited

U.S. PATENT DOCUMENTS 2,599,745 A   6/1952   Campbell et al.
2,634,236 A   4/1953   Simon et al.
(Continued)

FOREIGN PATENT DOCUMENTS

EA   9171   12/2007
RU   1340264   7/1996
(Continued)

OTHER PUBLICATIONS

G. Daccord, et al, "Cement-Formation Interactions," in Nelson EG and Guillot D (eds.): Well Cementing (2nd Edition), Schlumberger, Houston (2006) 191-219.
(Continued)

*Primary Examiner* — Doug Hutton, Jr.
*Assistant Examiner* — Ashish Varma
(74) *Attorney, Agent, or Firm* — Andrea E. Tran

(57) ABSTRACT

Methods for controlling fluid flow through one or more pathways in one or more rock formations penetrated by a borehole in a subterranean well, comprise injecting into or adjacent to the formation a treatment fluid comprising at least one polysaccharide polymer; at least one crosslinker; and fibers, or a mixture of fibers and particles. The fluids are pumped into the well through a tubular body that comprises at least one flow restriction. Shearing of the treatment fluid as it passes through the flow restriction causes the viscosity to decrease, allowing the fibers to form masses that migrate to formation-rock openings such as pores, cracks, fissures and vugs. As a result, the fibrous masses are useful for curing lost circulation, providing fluid-loss control and as diverting agents.

16 Claims, 5 Drawing Sheets

(51) Int. Cl.
*C09K 8/512* (2006.01)
*C09K 8/514* (2006.01)
*E21B 21/00* (2006.01)
*E21B 33/138* (2006.01)
*C09K 8/00* (2006.01)
*C09K 8/50* (2006.01)

(52) U.S. Cl.
CPC ............ *C09K 8/514* (2013.01); *E21B 21/003* (2013.01); *E21B 33/138* (2013.01); *C09K 2208/08* (2013.01)

(58) Field of Classification Search
USPC .............................................. 166/292, 305.1
See application file for complete search history.

(56) References Cited

U.S. PATENT DOCUMENTS

| | | | |
|---|---|---|---|
| 2,793,995 A | 5/1957 | Twining | |
| 2,799,647 A | 7/1957 | Borcherdt | |
| 3,375,888 A | 4/1968 | Lummus et al. | |
| 4,422,948 A | 12/1983 | Corley et al. | |
| 5,330,005 A * | 7/1994 | Card | C09K 8/665 166/280.2 |
| 2004/0149431 A1* | 8/2004 | Wylie | C09K 8/12 166/242.1 |
| 2005/0000690 A1* | 1/2005 | Boney | E21B 43/267 166/280.2 |
| 2009/0044945 A1 | 2/2009 | Willberg et al. | |
| 2009/0048126 A1* | 2/2009 | Phatak | C09K 8/685 507/209 |
| 2010/0152070 A1 | 6/2010 | Ghassemzadeh | |

FOREIGN PATENT DOCUMENTS

| | | |
|---|---|---|
| RU | 2387811 | 4/2010 |
| WO | 2006/030383 | 3/2006 |
| WO | 2012/064213 | 5/2012 |

OTHER PUBLICATIONS

L. Provost, et al., "Flluid Placement and Diversion in Sandstone Acidizing," In Econimides M and Nolte KG (EDS.): Reservoir Stimulation, Schlumberger, Houston (1987): 15-1-15-9.

* cited by examiner

METHODS FOR SERVICING SUBTERRANEAN WELLS

BACKGROUND OF THE INVENTION

The statements in this section merely provide background information related to the present disclosure and may not constitute prior art.

This invention relates to methods for servicing subterranean wells, in particular, fluid compositions and methods for operations during which the fluid compositions are pumped into a wellbore, make contact with subterranean formations, and block fluid flow through one or more pathways in the subterranean formation rock.

During the construction and stimulation of a subterranean well, operations are performed during which fluids are circulated in the well or injected into formations that are penetrated by the wellbore. During these operations, the fluids exert hydrostatic and pumping pressure against the subterranean rock formations. The formation rock usually has pathways through which the fluids may escape the wellbore. Such pathways include (but are not limited to) pores, fissures, cracks, and vugs. Such pathways may be naturally occurring or induced by pressure exerted during pumping operations.

During well construction, drilling and cementing operations are performed that involve circulating fluids in and out of the well. If some or all of the fluid leaks out of the wellbore during these operations, a condition known as "fluid loss" exists. There are various types of fluid loss. One type involves the loss of carrier fluid to the formation, leaving suspended solids behind. Another involves the escape of the entire fluid, including suspended solids, into the formation. The latter situation is called "lost circulation", it can be an expensive and time-consuming problem.

During drilling, lost circulation hampers or prevents the recovery of drilling fluid at the surface. The loss may vary from a gradual lowering of the mud level in the pits to a complete loss of returns. Lost circulation may also pose a safety hazard, leading to well-control problems and environmental incidents.

During cementing, lost circulation may severely compromise the quality of the cement job, reducing annular coverage, leaving casing exposed to corrosive downhole fluids, and/or failing to provide adequate zonal isolation.

Lost circulation may also be a problem encountered during well-completion and workover operations, potentially causing formation damage, lost reserves and even loss of the well.

Even if lost circulation is a decades-old problem, there is no single solution that can cure all lost-circulation situations. Lost-circulation solutions may be classified into three principal categories: bridging agents, surface-mixed systems and downhole-mixed systems. Bridging agents, also known as lost-circulation materials (LCMs), are solids of various sizes and shapes (e.g., granular, lamellar, fibrous and mixtures thereof). They are generally chosen according to the size of the voids or cracks in the subterranean formation and, as fluid escapes into the formation, congregate and form a barrier that minimizes or stops further flow.

One of the major advantages of using fibers is the ease with which they can be handled. A wide variety of fibers is available to the oilfield made from, for example, natural celluloses, synthetic polymers, and ceramics, minerals or glass. Most are available in various shapes, sizes, and flexibilities. Fibers generally decrease the permeability of a loss zone by creating a porous web or mat that filters out solids in the fluid, forming a low-permeability filter cake that can plug or bridge the loss zones. Typically, solids with a very precise particle-size distribution must be used with a given fiber to achieve a suitable filter cake. Despite the wide variety of available fibers, the success rate and the efficiency are not always satisfactory.

An extensive discussion of lost circulation and techniques by which it may be cured is presented in the following publication: Daccord G, Craster B, Ladva H, Jones T G J and Manescu G: "Cement-Formation Interactions," in Nelson E B and Guillot D (eds.): *Well Cementing* ($2^{nd}$ Edition), Schlumberger, Houston (2006) 191-219.

In the context of well stimulation, fluid loss is also an important parameter that must be controlled to achieve optimal results. In many cases, a subterranean formation may include two or more intervals having varying permeability and/or injectivity. Some intervals may possess relatively low injectivity, or ability to accept injected fluids, due to relatively low permeability, high in-situ stress and/or formation damage. When stimulating multiple intervals having variable injectivity it is often the case that most, if not all, of the introduced well-treatment fluid will be displaced into one, or only a few, of the intervals having the highest injectivity. Even if there is only one interval to be treated, stimulation of the interval may be uneven because of the in-situ formation stress or variable permeability within the interval. Thus, there is a strong incentive to evenly expose an interval or intervals to the treatment fluid; otherwise, optimal stimulation results may not be achieved.

In an effort to more evenly distribute well-treatment fluids into each of the multiple intervals being treated, or within one interval, methods and materials for diverting treatment fluids into areas of lower permeability and/or injectivity have been developed. Both chemical and mechanical diversion methods exist.

Mechanical diversion methods may be complicated and costly, and are typically limited to cased-hole environments. Furthermore, they depend upon adequate cement and tool isolation.

Concerning chemical diversion methods, a plethora of chemical diverting agents exists. Chemical diverters generally create a cake of solid particles in front of high-permeability layers, thus directing fluid flow to less-permeable zones. Because entry of the treating fluid into each zone is limited by the cake resistance, diverting agents enable the fluid flow to equalize between zones of different permeabilities. Common chemical diverting agents include bridging agents such as silica, non-swelling clay, starch, benzoic acid, rock salt, oil soluble resins, naphthalene flakes and wax-polymer blends. The size of the bridging agents is generally chosen according to the pore-size and permeability range of the formation intervals. The treatment fluid may also be foamed to provide a diversion capability.

In the context of well stimulation, after which formation fluids such as hydrocarbons are produced, it is important to maximize the post-treatment permeability of the stimulated interval or intervals. One of the difficulties associated with many chemical diverting agents is poor post-treatment cleanup. If the diverting agent remains in formation pores, or continues to coat the formation surfaces, production will be hindered.

A more complete discussion of diversion and methods for achieving it is found in the following publication: Provost L and Doerler N: "Fluid Placement and Diversion in Sandstone Acidizing," in Economides M and Nolte K G (eds.): *Reservoir Stimulation*, Schlumberger, Houston (1987): 15-1-15-9.

Therefore, despite the valuable contributions of the prior art, there remains a need for improved materials and techniques for controlling the flow of fluids from the wellbore into formation rock. This need pertains to many operations conducted during both well construction and well stimulation.

SUMMARY OF THE INVENTION

Embodiments provide improved means for solving the aforementioned problems associated with controlling fluid flow from the wellbore into formation rock.

In a first aspect, embodiments relate to methods for controlling fluid flow through one or more pathways in one or more rock formations penetrated by a borehole in a subterranean well.

In a further aspect, embodiments relate to methods for curing lost circulation in a subterranean well penetrated by a borehole.

In yet a further aspect, embodiments relate to methods of treating a subterranean formation penetrated by a wellbore.

DETAILED DESCRIPTION

Figure 1:
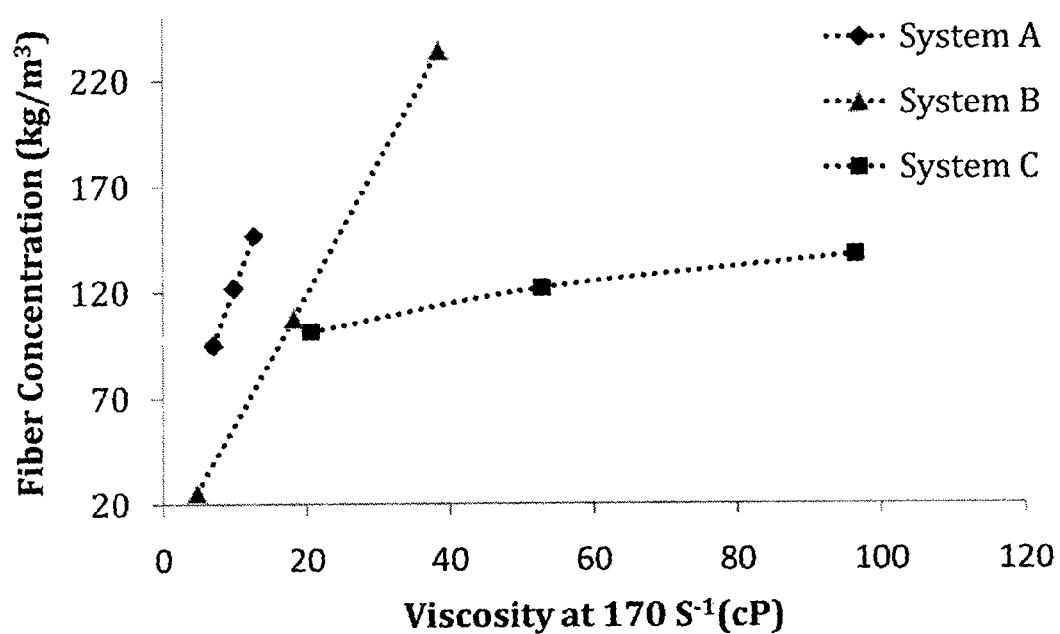
FIG. 1 shows the relationship between fluid viscosity and the fiber concentration necessary to form a bridge across a slot.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

Embodiments relate to methods for controlling fluid flow through pathways in rock formations penetrated by a borehole in a subterranean well. The disclosed methods are applicable to treatments associated with well-service activities that are conducted throughout the life of a well, including (but not limited to) well construction, well stimulation and workover operations.

The inventors have surprisingly discovered that fluids comprising at least one polysaccharide polymer, at least one crosslinker and fibers may be useful for controlling fluid flow through openings in rock formations penetrated by a borehole in a subterranean well. Optionally, solid particles may be present in the fluids. When these fluids are subjected to a high-shear environment, they lose viscosity. Without wishing to be bound by any theory, the lower viscosity promotes fiber entanglement and the formation of fiber aggregates or flocs.

Without wishing to be bound by any theory, it is believed that when these fluids are subjected to high shear in the wellbore during a pumping operation, the flocs will tend to congregate against, bridge or plug pathways in the formation rock through which wellbore fluids may flow. Such pathways may include (but not be limited to) pores, cracks, fissures and vugs. Furthermore, it is believed that the flocs will preferentially flow toward pathways accepting fluid at higher rates. Shear is thought to be the principal parameter triggering flocculation. The addition of chemical triggers may not be necessary, and the flocculation may not be temperature dependent.

When the flocs congregate against the rock-formation pathways, they are believed to hinder further fluid flow. The inventors believe that this effect may be useful during a wide range of well-service operations, including (but not limited to) curing lost circulation during drilling and cementing, and providing fluid-loss control during drilling, cementing, matrix acidizing, acid fracturing, hydraulic fracturing, formation-consolidation treatments, sand-control treatments and workover operations. In the context of cementing, the flocs may be useful during both primary and remedial cementing. The flocs may also be particularly useful for providing fluid diversion when treating multiple formations with different permeabilities or injectivities, or a single formation whose permeability and injectivity are variable.

The treatment fluid may be an aqueous base fluid made with fresh water, seawater, brine, etc., depending upon compatibility with the viscosifier and the formation.

In an aspect, embodiments relate to methods for controlling fluid flow through one or more pathways in one or more rock formations penetrated by a subterranean well. A treatment fluid is prepared that comprises (a) at least one polysaccharide polymer, (b) at least one crosslinker, and (c) fibers, or a mixture of fibers and particles. The treatment fluid is pumped into the well through a tubular body that comprises at least one flow restriction. As the treatment fluid passes through the flow restriction, it is subjected to a high-shear environment. Then the fluid is injected into or adjacent to the formation.

In a further aspect, embodiments of the invention relate to methods for curing lost circulation in a subterranean well penetrated by a borehole. A treatment fluid is prepared that comprises (a) at least one polysaccharide polymer, (b) at least one crosslinker, and (c) fibers, or a mixture of fibers and particles. The treatment fluid is pumped into the well through a tubular body that comprises at least one flow restriction. As the treatment fluid passes through the flow restriction, it is subjected to a high-shear environment. Then the fluid is injected into or adjacent to the formation.

In yet a further aspect, embodiments of the invention relate to methods for treating a subterranean formation penetrated by a wellbore. A treatment fluid is prepared that comprises (a) at least one polysaccharide polymer, (b) at least one crosslinker, and (c) fibers, or a mixture of fibers and particles. The treatment fluid is pumped into the well through a tubular body that comprises at least one flow restriction. As the treatment fluid passes through the flow restriction, it is subjected to a high-shear environment. Then the fluid is injected into or adjacent to the formation.

In the various embodiments of the invention, the polysaccharide polymers may include (but not be limited to) guar, carboxymethylhydroxypropyl guar (CHMPG) and hydroxypropylguar (HPG). The polymer concentration is preferably between about 1.8 g/L and 7.2 g/L, more preferably between about 1.8 g/L and 4.8 g/L, and most preferably between about 1.8 g/L and 2.4 g/L of treatment fluid.

The polymer-fluid crosslinker may comprise one or more water-soluble multivalent-ion compounds containing one or more cations preferentially selected from the group comprising $Fe^{2+}$, $Fe^{3+}$, $Al^{3+}$, $Ti^{4+}$, $Zn^{2+}$, $Sn^{4+}$, $Ca^{2+}$, $Mg^{2+}$, $Cr^{3+}$ and $Zr^{4+}$. In addition, water-soluble borate compounds may be employed. Preferred crosslinkers may comprise water-soluble $Ti^{4+}$ and $Zr^{4+}$ compounds. The crosslinker concentration is preferably between about 0.05 mL/L and 0.5 mL/L of treatment fluid. For the water-soluble $Ti^{4+}$ crosslinker, the more preferred concentration range lies between about 0.15 mL/L and 0.40 mL/L of treatment fluid, and the most preferred concentration range lies between about 0.30 mL/L and 0.40 mL/L of treatment fluid. For the water-soluble $Zr^{4+}$ crosslinker, the more preferred concentration range lies between about 0.10 mL/L and 0.35 mL/L of treatment fluid, and the most preferred concentration range lies between about 0.10 mL/L and 0.20 mL/L of treatment fluid.

The viscosity provided by the crosslinked-polymer fluid may allow optimal fibers and solids transport and prevent bridging or plugging as the fluid is pumped to its destination through the tubular body.

The fibers of the invention may comprise (but not be limited to) polylactic acid, polyester, polylactone, polypropylene, polyolefin, polyamide, polyphenol-formaldehyde, polyvinyl alcohol, polyvinyl chloride, carbon fiber, polyurethane, glass and mixtures thereof. The fiber-concentration in the treatment fluid is preferably between about 6 g/L and about 72 g/L of treatment fluid, more preferably between about 12 g/L and 36 g/L of treatment fluid and most preferably between about 12 g/L and 24 g/L of treatment fluid. The preferred fiber-length range is between about 2 mm and 25 mm, more preferably between about 4 mm and 18 mm, and most preferably between about 5 mm and 10 mm. The preferred fiber-diameter range is between about 1 µm to 200 µm, more preferably between about 1.5 µm and 100 µm, and most preferably between about 10 µm and 20 µm. An advantage offered by some of the aforementioned fibers is that, for example, the polypropylene and polyolefin fibers are soluble in liquid hydrocarbons such as crude oil, and others will degrade through hydrolysis in the presence of traces of water and heat. With time, they may dissolve and be carried away by the produced hydrocarbon fluid, providing improved cleanup and well production.

Mixtures of fibers may also be used, for example as described in U.S. Patent Application Publication No. 20100152070. For example, the fibers may be a blend of long fibers and short fibers. Preferably, the long fibers are rigid and the short fibers are flexible. It is believed that such long fibers form a tridimensional mat or net in the flow pathway that traps the particles, if present, and the short fibers.

When present, the solid particles may comprise (but not be limited to) polylactic acid, polyester, calcium carbonate, quartz, mica, alumina, aluminosilicates, clay, barite, hematite, ilmenite, manganese tetraoxide, and mixtures thereof. The preferred solid-particle-size range is between about 5 µm and 1000 µm, more preferably between about 10 µm and 300 µm, and most preferably between about 15 µm to 150 µm. The preferred solid-particle concentration range is between about 6 g/L and 72 g/L of treatment fluid, more preferably between about 12 g/L and 36 g/L of treatment fluid, and most preferably between about 15 g/L and 20 g/L of treatment fluid.

The treatment fluid may preferably be pumped through the flow restriction at a rate sufficient to expose the fluid to a shear rate exceeding about 1500 $s^{-1}$. More preferably, the shear rate may exceed about 5000 $s^{-1}$. Most preferably, the shear rate may exceed about 10,000 $s^{-1}$. Suitable flow restrictions may include (but not be limited to) drill bits, perforations and chokes.

EXAMPLES

The following examples serve to further illustrate the invention.

Example 1

Experiments were performed to determine the relationship between fluid viscosity and the ability of fibers to bridge across a slot, simulating a crack in the formation wall. Fluids based on three thickeners were prepared. The compositions are given below.

System A: Two aqueous solutions were prepared containing a quaternary ammonium salt of a fatty acid (C-6212, available from Akzo Nobel, Chicago, Ill., USA) and a urea ammonium chloride solution (ENGRO 28-0-0, available from Agrium, Calgary, Alberta, CANADA). The first fluid contained 0.5 vol % C-6212 and 1.5 vol % ENGRO 28-0-0. The second fluid contained 0.75 vol % C-6212 and 1.5 vol % ENGRO 28-0-0. The fluid viscosities were 9 cP and 10 cP at 170 $s^{-1}$ respectively.

System B: Three aqueous solutions were prepared containing erucic amidopropyl dimethyl betaine, available from Rhodia, Cranbury, N.J., USA. The first fluid contained 0.75 vol % of the betaine. The second fluid contained 1.0 vol % of the betaine, and the third contained 1.5 vol % of the betaine. The fluid viscosities were 5 cP, 18 cP and 39 cP at 170 $s^{-1}$ respectively.

System C: Three aqueous solutions were prepared containing guar gum. The guar-gum concentrations were 2.4 kg/m$^3$, 3.6 kg/m$^3$ and 4.8 kg/m$^3$. The fluid viscosities were 21 cP, 53 cP and 96 cP at 170 $s^{-1}$ respectively.

The fibers employed in the experiments were made of polylactic acid (PLA). The fibers were 6 mm long and 12 µM in diameter.

Figure 2:
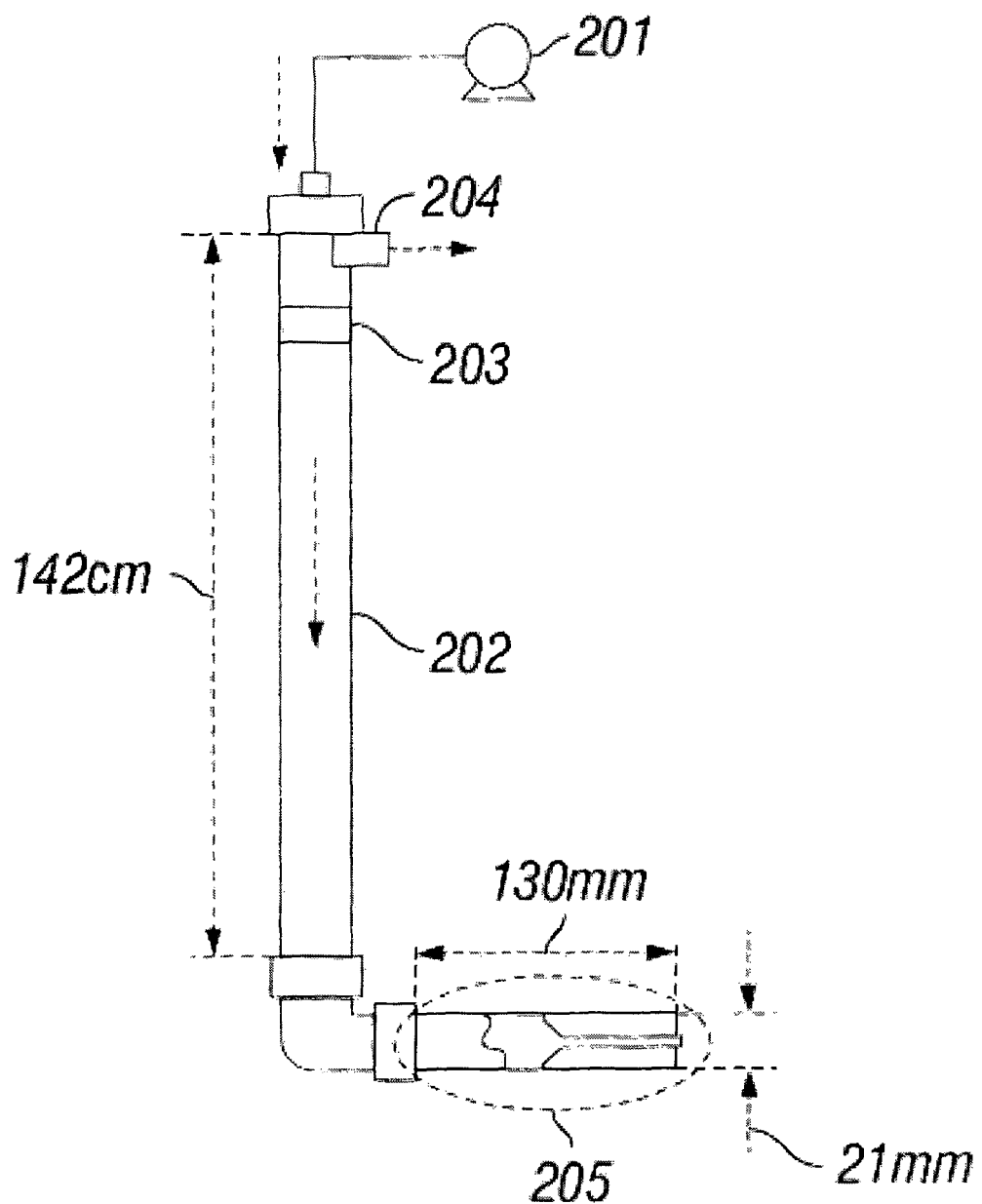
FIG. 2 is a schematic diagram of an apparatus for evaluating the plugging ability of a treatment fluid.

The test apparatus, shown in FIG. 2, was designed to simulate fluid flow into a formation-rock void. A pump 201 is connected to a tube 202. The internal tube volume is 500 mL. A piston 203 is fitted inside the tube. A pressure sensor 204 is fitted at the end of the tube between the piston and the end of the tube that is connected to the pump. A slot assembly 205 is attached to the other end of the tube.

Figure 3:
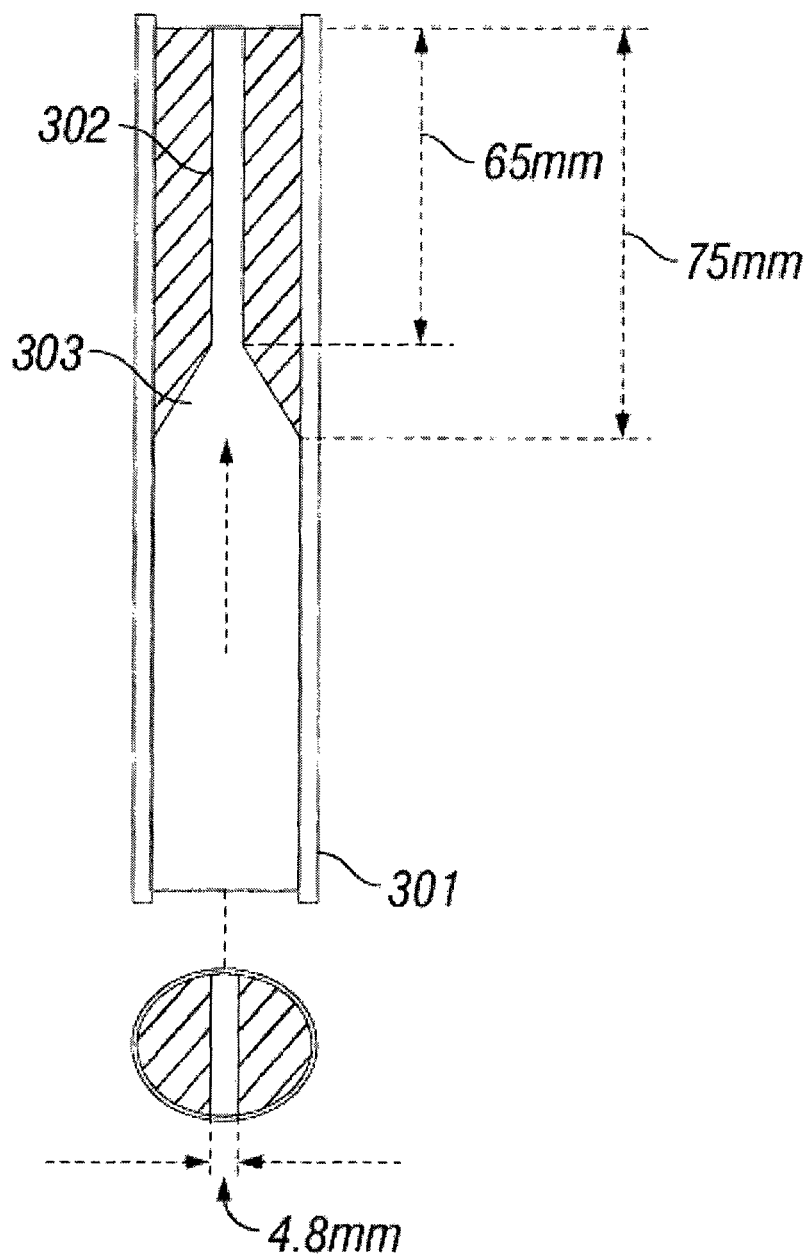
FIG. 3 is a detailed diagram of the slot of the apparatus depicted in FIG. 2.

A detailed view of the slot assembly is shown in FIG. 3. The outer part of the assembly is a tube 301 whose dimensions are 130 mm long and 21 mm in diameter. The slot 302 is 65 mm long and 2.0 mm wide. Preceding the slot is a 10-mm long tapered section 303.

For each test, 500 mL of fluid containing PLA fibers were prepared. The fibers were added manually and dispersed throughout the test fluid. After transferring the test fluid to the tube 202, the piston 203 was inserted. The tube was sealed, and water was pumped at a rate whereby the piston-displacement rate was 0.5 m/s (24 mL/min). Fiber bridging across the slot was indicated when the system pressure rose above 0.35 MPa (50 psi).

Inspection of FIG. 1 reveals that the fiber concentration necessary to cause bridging across the slot decreases with decreasing fluid viscosity.

Example 2

Figure 4:
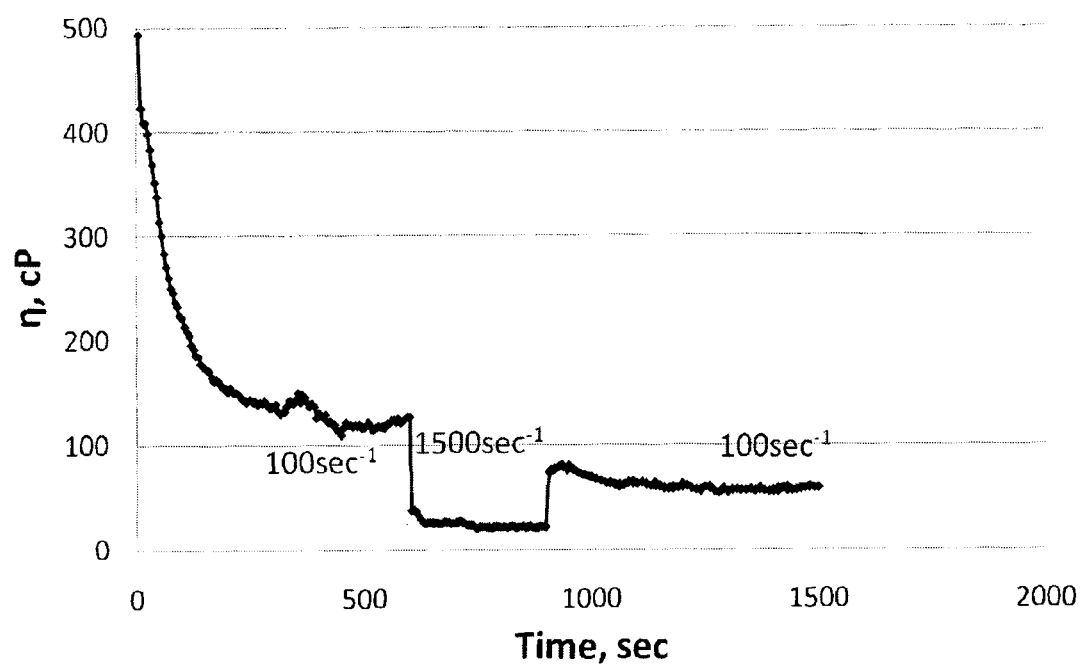
FIG. 4 illustrates the shear sensitivity of a guar solution.

An aqueous solution of guar gum was prepared in a Waring blender. The guar concentration was 1.8 g/L. A sample of the guar solution was then transferred to a Paar Physica viscometer. The fluid viscosity was continuously monitored as the fluid was exposed to an initial 10-min shearing period at 100 s$^{-1}$, then 1500 s$^{-1}$ for a 5-min shearing period at 1500 s$^{-1}$, then a final 10-min shearing period at 100 s$^{-1}$. The shearing period at 1500 s$^{-1}$ simulated the passage of the fluid through a flow restriction in a tubular body. The results are presented in FIG. 4. During the first shearing period at 100 s$^{-1}$, the fluid viscosity became stable at 127 cP. After the shearing period at 1500 s$^-$, the fluid viscosity was 60 cP after the shear rate was restored to 100 s$^{-1}$.

The viscosity decrease resulting from the high-shear-rate period is used to calculate a Stability Index according to Eq. 1.

$$I_S = \frac{\eta_\infty}{\eta_0} \times 100, \text{ –where} \qquad (\text{Eq. 1})$$

$I_s$=Stability Index,
$\eta_0$=fluid viscosity prior to high-shear-rate period, and
$\eta_\infty$=fluid viscosity after high-shear-rate period.
For this experiment, the Stability Index $I_x$ for the guar solution was 47.

Example 3

Two titanium-crosslinked guar fluids were prepared in a Waring blender. The guar concentration was 2.4 g/L, and the titanium-crosslinker concentrations were 0.07 mL/L and 0.08 mL/L. The crosslinker was an 80-wt % solution of triethanolamine titanate in isopropyl alcohol.

Figure 5:
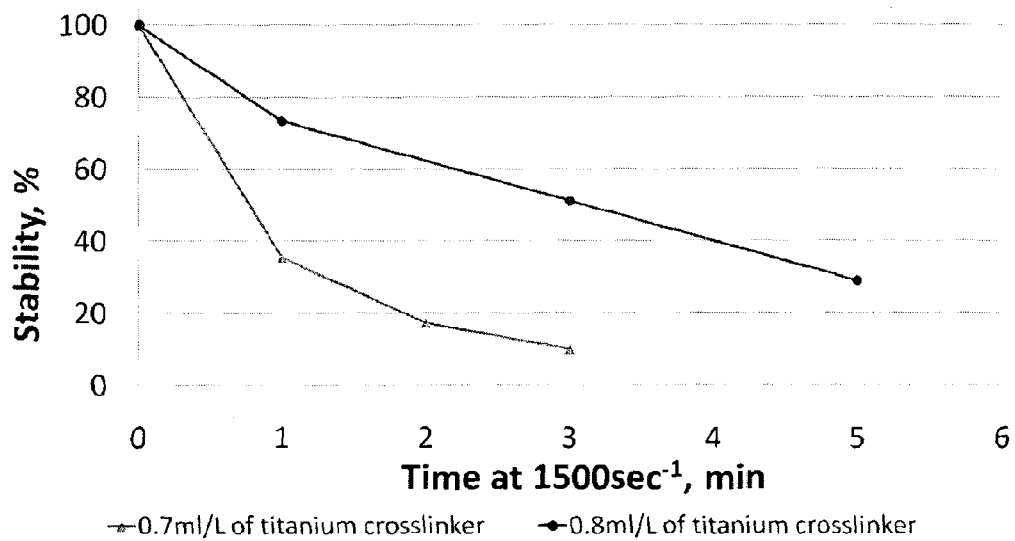
FIG. 5 illustrates the shear sensitivities of two titanium-crosslinked guar fluids.

A series of crosslinked-guar fluids were then tested in a Paar Physica viscometer. The fluid viscosities were continuously monitored as the fluids were exposed to an initial 10-min shearing period at 100 s$^{-1}$, a 1500-s$^{-1}$ shearing period, then a final 10-min shearing period at 100 s$^{-1}$. The duration of the 1500-s$^{-1}$ shearing period varied between 1 min and 5 min. Stability Indices were then calculated. The results are presented in FIG. 5. At both crosslinker concentrations, the Stability Index decreased as the duration of the 1500-s$^{-1}$ shearing period increased.

Example 4

The shearing stability of five fluids was tested. The first fluid was a polylactic-acid emulsion: PL-1000, manufactured by Miyoshi Oil & Fat Company, Tokyo, Japan. The second fluid was 12-g/L solution of hydroxyethyl cellulose: CELLOSIZE™ HEC 10, manufactured by The Dow Chemical Company. The third fluid was a zirconium-crosslinked CMHPG fluid. The CMHPG concentration was 3.0 g/L, and the crosslinker concentration was 0.3 mL/L. The crosslinker was a solution containing 22.6 wt % sodium zirconium lactate, 53.8 wt % water and 13.6 wt % methanol. The fourth fluid was a borate-crosslinked guar fluid. The guar concentration was 1.8 g/L, and the crosslinker concentration was 0.5 mL/L. The crosslinker was boric acid. The fifth fluid was a titanium-crosslinked guar fluid. The guar concentration was 3.0 g/L, and the crosslinker concentration was 0.07 mL/L. The crosslinker was an 80-wt % solution of triethanolamine titanate in isopropyl alcohol.

Figure 6:
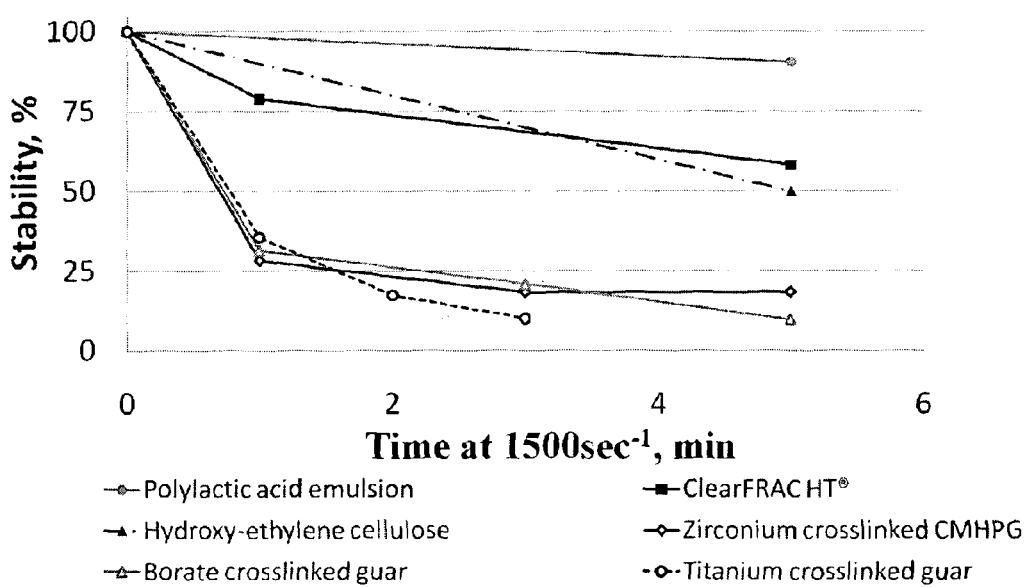
FIG. 6 illustrates the shear sensitivities of a polylactic-acid emulsion, a hydroxyethyl-cellulose solution, a zirconium-crosslinked CMHPG fluid, a borate-crosslinked guar fluid and a titanium-crosslinked guar fluid.

With the exception of the polylactic-acid emulsion, the fluids were prepared in a Waring blender. The fluids were transferred to a Paar Physica viscometer. The fluid viscosities were continuously monitored as the fluids were exposed to an initial 10-min shearing period at 100 s$^{-1}$, a 1500-s$^{-1}$ shearing period, then a final 10-min shearing period at 100 s$^{-1}$. The duration of the 1500-s$^{-1}$ shearing period varied between 1 min and 5 min. Stability Indices were then calculated. The results are presented in FIG. 6.

The results showed that the crosslinked-polymer fluids are significantly more shear-sensitive than the polylactic-acid and hydroxyethyl-cellulose fluids. They would better promote the formation of fiber flocs, and therefore would preferred for use in the present invention.

The invention claimed is:

1. A method for controlling fluid flow through one or more pathways in one or more rock formations penetrated by a borehole in a subterranean well, comprising:
   i. preparing a treatment fluid comprising (a) at least one polysaccharide polymer, (b) at least one crosslinker, and (c) fibers or a mixture of fibers and particles;
   ii. pumping the treatment fluid into the well through a tubular body that comprises at least one flow restriction; wherein the treatment fluid is pumped through the flow restriction of the tubular body at a rate sufficient to subject the treatment fluid to a shear rate higher than about 1500 s$^1$; and
   iii. injecting the treatment fluid into or adjacent to the formation.

2. A method for curing lost circulation in a subterranean well penetrated by a borehole comprising:
   i. preparing a treatment fluid comprising (a) at least one polysaccharide polymer, (b) at least one crosslinker, and (c) fibers or a mixture of fibers and particles;
   ii. pumping the treatment fluid into the well through a tubular body that comprises at least one flow restriction; wherein the treatment fluid is pumped through the flow restriction of the tubular body at a rate sufficient to subject the treatment fluid to a shear rate higher than about 1500 s$^1$; and
   iii. injecting the treatment fluid into or adjacent to the formation.

3. A method of treating a subterranean formation penetrated by a wellbore, comprising:

i. preparing a treatment fluid comprising (a) at least one polysaccharide polymer, (b) at least one crosslinker, and (c) fibers or a mixture of fibers and particles;
ii. pumping the treatment fluid into the well through a tubular body that comprises at least one flow restriction; wherein the treatment fluid is pumped through the flow restriction of the tubular body at a rate sufficient to subject the treatment fluid to a shear rate higher than about 1500 s$^1$; and
iii. injecting the treatment fluid into or adjacent to the formation.

4. The method of claim 1, wherein the polysaccharide polymer comprises one or more members of the list comprising guar, carboxymethylhydroxypropyl guar and hydroxypropyl guar.

5. The method of claim 1, wherein the polysaccharide-polymer concentration is between about 1.8 g/L and about 7.2 g/L of treatment fluid.

6. The method of claim 1, wherein the crosslinker comprises one or more members of the list comprising a water-soluble titanium compound, a water-soluble zirconium compound, a water-soluble borate compound and a water-soluble aluminum compound.

7. The method of claim 1, wherein the crosslinker concentration in the treatment fluid is between about 0.05 mL/L and 0.5 mL/L of treatment fluid.

8. The method of claim 1, wherein the fibers comprise one or more members of the list comprising polylactic acid, polyester, polylactone, polypropylene, polyolefin, polyamide, polyphenol-formaldehyde, polyvinyl alcohol, polyvinyl chloride, carbon fiber, polyurethane and glass.

9. The method of claim 1, wherein the fiber concentration is between about 6 g/L and 72 g/L of treatment fluid.

10. The method of claim 1, wherein the fiber length is between about 2 mm and 25 mm, and the fiber diameter is between about 1 μm and 200 μm.

11. The method of claim 1, wherein the particles comprise one or more members of the list comprising polylactic acid, polyester, calcium carbonate, quartz, mica, alumina, aluminosilicates, clay, barite, hematite, ilmenite and manganese tetraoxide.

12. The method of claim 1, wherein the particle concentration is between about 6 g/L and 72 g/L of treatment fluid.

13. The method of claim 1, wherein the particle size is between 5 m and 1000 μm.

14. The method of claim 1, wherein the at least one tubular-body restriction comprises a drill bit.

15. The method of claim 1, wherein the at least one tubular-body restriction comprises one or more perforations.

16. The method of claim 1, wherein the at least one tubular-body restriction comprises one or more chokes.

* * * * *